US006377873B1

(12) United States Patent
Troll

(10) Patent No.: US 6,377,873 B1
(45) Date of Patent: Apr. 23, 2002

(54) METHOD FOR DETERMINING OPTIMUM PRESSURE FOR FORMING A BUBBLE IN LIQUID

(75) Inventor: Mark A. Troll, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/379,380

(22) Filed: Aug. 23, 1999

(51) Int. Cl.[7] .......................... G05B 13/00; G02B 6/26

(52) U.S. Cl. .......................... 700/275; 385/18

(58) Field of Search .......................... 700/275, 301; 702/138; 385/18, 17

(56) References Cited

U.S. PATENT DOCUMENTS 4,589,730 A * 5/1986 Obu .......................... 350/267
4,988,157 A * 1/1991 Jackel et al. .......................... 350/96.13
5,699,462 A * 12/1997 Fouquet et al. .......................... 385/18
5,960,131 A * 9/1999 Fouquet et al. .......................... 385/17
6,212,308 B1 * 4/2001 Donald .......................... 385/16

* cited by examiner

*Primary Examiner*—Paul P. Gordon

(57) ABSTRACT

A method for determining the optimum ambient pressure at which to form a bubble in a liquid. Forming a bubble in a liquid has application in a variety of applications in which a bubble is formed in a liquid. Determining the optimum ambient pressure minimizes the amount of energy required to form the bubble in the liquid.

6 Claims, 3 Drawing Sheets

METHOD FOR DETERMINING OPTIMUM PRESSURE FOR FORMING A BUBBLE IN LIQUID

TECHNICAL FIELD

The present invention relates generally to forming a bubble in liquid, and, more particularly, to a method for determining the optimum pressure for forming a bubble in a liquid.

BACKGROUND OF THE INVENTION

There are many technologies that make use of the ability to form and maintain a bubble in a liquid. For example, devices using bubbles have been used as valves, pumps, switches, and other functions. The formation of a bubble causes nearby liquid to move. The liquid motion may be used to actuate a mechanism such as changing the state of a fluidic valve, pushing on a mechanical switch, changing the reading on a pressure sensor, or the like. Alternatively, the bubble itself may be used to block fluid motion, as part of a display, or a region of low refractive index for control of optical functions (e.g., to block or reflect a beam of light).

Generally, a bubble is formed in a liquid by heating the liquid using an adjacent hot surface, although other means (light, electrical current, microwave) can be employed. Since it is difficult to confine heating to a small spatial region, a portion of the applied heat goes to heating adjacent material such as support structures, electrical conductors, and the like. It is customary to form bubbles in these systems at pressures equal to or close to atmospheric pressure. Unfortunately, at pressure close to atmospheric pressure a relatively high temperature is required to boil the liquid and form the bubble. At this relatively high temperature, the heat lost to the surrounding support structures may prove excessive for the system.

When a bubble is created at a sub-atmospheric pressure, the bubble is formed at a lower temperature than when formed at atmospheric pressure, leading to lower heat loss. However, creating a bubble in a liquid at a lower temperature also increases the heat of vaporization per mole and the work that must be performed against the surface tension required to create the bubble compared with creating the bubble at a higher temperature. Therefore, it would be desirable to have a way to determine whether it is beneficial to form a bubble in a liquid at pressures below atmospheric pressure, which will reduce the temperature at which the bubble forms.

SUMMARY OF THE INVENTION

The invention provides a method by which to accurately determine the optimum pressure with which to operate a device in which a bubble is formed within a container.

The present invention may be conceptualized as a method for determining optimum ambient pressure that minimizes the energy required to form a bubble of a given volume in a liquid, the method comprising the following steps: entering a first pressure and a second pressure; calculating a first boiling temperature corresponding to the first pressure; calculating a second boiling temperature corresponding to the second pressure; entering a surface tension of the bubble at the first boiling temperature and the second boiling temperature; entering a heat of vaporization ($H_v$) value of the liquid at the first boiling temperature and the second boiling temperature; calculating a first energy required to vaporize the liquid at the first pressure; calculating a second energy required to vaporize the liquid at the second pressure; determining whether the first energy required at the first pressure is greater than the second energy required at the second pressure; and forming the bubble at the pressure corresponding to the lower of the first energy or the second energy.

The invention has numerous advantages, a few of which are delineated, hereafter, as merely examples.

An advantage of the invention is that it allows a bubble to be formed within a container using the lowest possible pressure, and therefore, at the lowest possible temperature.

Another advantage of the invention is that it allows for the rapid formation of a bubble in a liquid.

Another advantage of the invention is that it allows for the accurate determination of the optimal system pressure in a bubble-actuated device.

Another advantage of the invention is that it minimizes the energy required to form a bubble in a given liquid and in a given geometry.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

Figure 1:
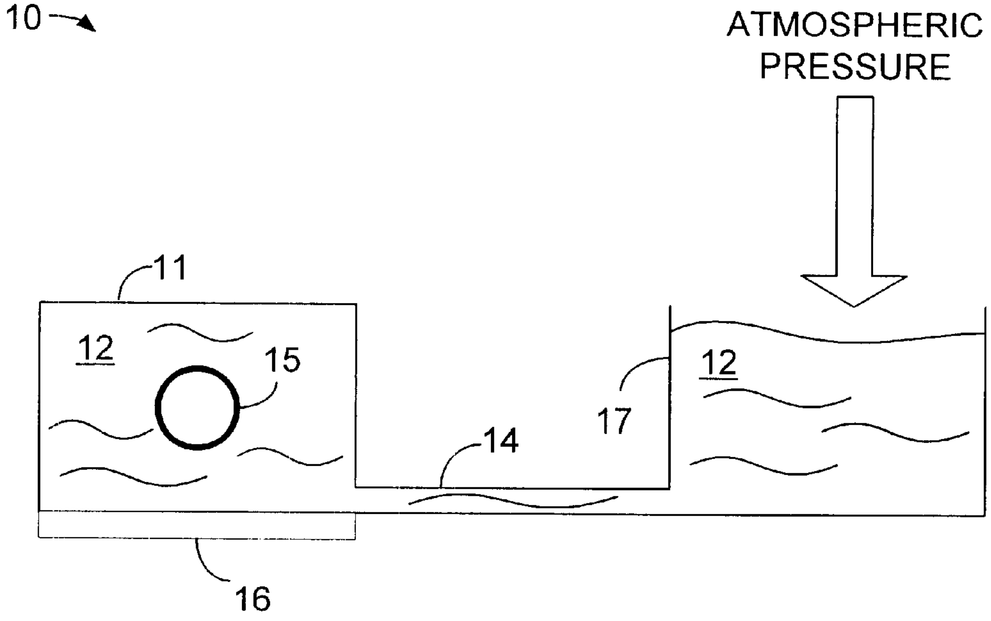
FIG. 1 is a simplified schematic view illustrating a bubble formed in a liquid that is at ambient atmospheric pressure.

Methods that allow the bubble to be formed at lower temperature reduce the heating requirement not only for the liquid being vaporized, but also for all the adjacent materials.

All liquids vaporize (i.e., form bubbles of vapor when heated) at a lower temperature when the pressure on them is reduced. When the only pressure applied to the liquid is the vapor pressure of the liquid, the temperature at which the bubble forms can be as low as a few degrees above the ambient temperature. Operating at lower pressure, therefore, has the considerable advantage of lowering the temperature to which the liquid must be heated to form the bubble.

In addition, when the goal is to form a bubble of a given volume, the mass of solid or liquid material (e.g., the number of moles) required to be vaporized is reduced at lower ambient pressures, as the same mass of material when vaporized occupies a greater volume at lower pressures. A device requiring any given bubble volume for operation would require that approximately $1/50^{th}$ of the material be vaporized if operated at $1/50^{th}$ of atmospheric pressure, for example, compared with operation at atmospheric pressure. This means the total energy required to vaporize the necessary material can potentially be reduced by a factor of about 50.

A new type of optical switch that uses bubble formation to redirect light is disclosed in commonly assigned U.S. Pat. No. 5,699,462 to Fouquet et al., in which an optical switch element is located at an intersection of two optical waveguides. Depending on whether a bubble is present within the optical switch element, light is either transmitted through the switch element continuing axially on the original waveguide, or reflected by the switch element onto a waveguide that intersects the original waveguide. The switch element is filled with a material that, while in a transmissive state, has an index of refraction substantially equal to that of the waveguide, thus allowing light in the waveguide to pass through the switch element. The state of the material within the switch element may be changed, through the operation of heaters or the like within the switch element, to cause a bubble of gas to form in the switch element. While present in the switch element, the bubble causes a refractive index mismatch between the waveguide and the switch element, which reflects the light in the waveguide onto the intersecting waveguide. This state is known as the reflective state. The operation of a preferred and many alternative embodiments of this switch element is set forth in U.S. Pat. No. 5,699,462 mentioned above, which is hereby incorporated by reference.

The invention is a method for determining the optimum pressure at which to form a bubble in a liquid. As mentioned above, the invention is applicable to all instances in which it is desirable to form a bubble in a liquid. However, the invention may find particular use in the above-mentioned optical switch, or in bubble-actuated devices, such as a liquid pump, or any device in which a bubble formed in a liquid causes actuation of the device.

When determining the optimum pressure at which to form a bubble several conflicting factors must be considered. For example, as stated above, lowering the pressure at which a bubble is formed in a liquid reduces the temperature at which the bubble is formed and reduces the mass of liquid that must be vaporized to form a bubble of a given volume. On the other hand, forming the bubble at a reduced temperature increases the heat of vaporization per mole of liquid, and also increases the surface tension work in creating the bubble compared to forming the bubble at a higher temperature. The work against surface tension, or the work required to create gas-liquid and gas-solid interfaces, depends on the surface tension of the liquid, which decreases with increasing temperature, and shape and area of the particular interface. The method of the invention examines all these effects to determine whether lowering the ambient pressure provides a net reduction in the energy required to form the bubble and is therefore beneficial.

For example, forming a bubble at an ambient pressure lower than atmospheric pressure lowers the temperature at which the liquid boils to form a bubble. In addition, because a given mass of gas occupies a greater volume at lower pressure, the mass of material required to be vaporized to form a bubble of a given volume is significantly reduced when the ambient pressure is reduced below atmospheric pressure.

For most liquids, when the surface area of the bubble is sufficiently small that the energy increase required by the increased molar heat of vaporization and the increased work against surface tension is less than the energy reduction resulting from heating the liquid to a lower vaporization temperature and the reduced mass of material that must be vaporized, it is beneficial to form the bubble at the reduced pressure.

For a bubble of a given volume, the surface area may vary depending upon the shape of the bubble. For example, for a given volume, a spherical bubble will have a smaller surface area than a bubble having the same volume that, for example, may be formed within a rectangular chamber. The method described below determines, for a particular surface area of a bubble, whether, the surface area is sufficiently low to benefit from operating at a lower pressure.

The method of the invention considers these factors in determining whether pressure reduction is beneficial for a particular instance.

Furthermore, the method of the invention can be used to determine the operational limits of bubble-actuated devices. The energy required for high speed operation may exceed the material limits of the heater, the electrical capacity of wiring, or the electronics used to supply the heater, or the allowed energy consumption of the device. Further still, the method of the invention can be used to ensure that the output capability of an optical source is not exceeded.

FIG. 1 is a simplified schematic view illustrating a bubble formed in a liquid that is under ambient atmospheric pressure. Bubble 15 is formed in liquid 12 that is contained within chamber 11 upon application of heat from heating element 16. The liquid in chamber 11 enters the chamber from reservoir 17 through fluid channel 14. Reservoir 17 is exposed to ambient atmospheric pressure as shown. It is understood that FIG. 1 is a simplified schematic drawing used to illustrate the basic principles of bubble formation in a liquid and that many implementation details have been omitted.

Figure 2:
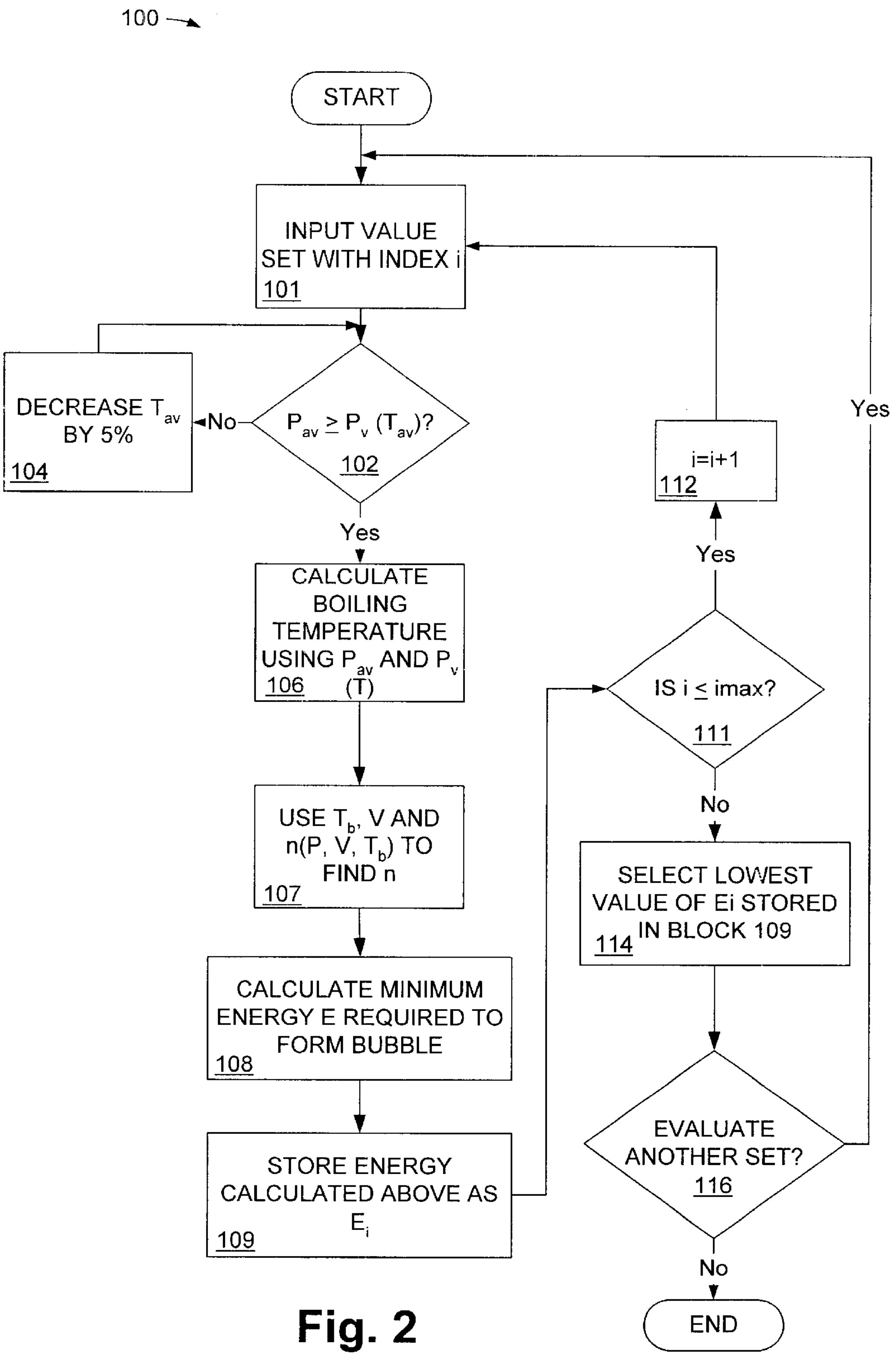
FIG. 2 is a flow chart illustrating a preferred embodiment of the method of the invention.

FIG. 2 is a flowchart illustrating a preferred embodiment of the method of the invention for optimizing the pressure at which a bubble is formed in a liquid. The method of the invention is intended to allow the comparison of the minimum energy requirements for forming a bubble in a liquid under varying operating conditions, bubble configurations and liquids. The inputs to the method may be obtained in several ways. For example, the input values or functions may be obtained from available literature; the input values or functions may be estimated using known chemical estimation techniques as described in "The Properties of Liquids and Gasses," 4$^{th}$ edition, Reid, Robert C., John M. Prausnitz, and Bruce V. Poling, 1987; or the input values and functions may be determined through experimental measurements.

The inputs to the method can be divided into three categories:

1) bubble properties:
   a) volume of the bubble (V)
   b) surface area of the bubble (A)
   c) mean radius of curvature of the bubble ($R_m$).
2) liquid properties as a function of temperature:
   a) vapor pressure ($P_v$ (T))
   b) surface tension $\sigma$ (T)
   c) heat of vaporization $H_v$ (T)
   d) heat capacity $C_p$ (T)
   e) equation of state n (P, V, T), where n is the number of moles of material at pressure P, volume V, and temperature T.
3) operating conditions in the interior of the device:
   a) average temperature $T_{av}$,
   b) average pressure $P_{av}$.

The flowchart in FIG. 2 illustrates the method according to the invention for use in determining the optimum ambient pressure for use when the mean radius of curvature $R_m$ of the bubble is not known. The method in FIG. 2 will compare a number, imax, of combinations of input conditions and store the calculated energy for each.

In block 101 a set of values for each of the inputs set forth above with index i is input. This set may contain different values for any of the inputs.

In decision block 102 it is determined whether the average pressure $P_{av}$ is greater than or equal to the vapor pressure $P_v$ at average temperature $T_{av}$. The average temperature $T_{av}$ is the temperature of the liquid when the heater that causes the bubble to form is inactive, or is the temperature of the system in a region unaffected by an active heater. The average pressure $P_{av}$ should be sufficiently high so that there is liquid present in the system. If the average pressure $P_{av}$ is less than the vapor pressure $P_v$, then only vapor will exist in the system. This test ensures that there will be some liquid present in the system. If the average pressure is less than the vapor pressure at the average temperature, then, in block 104, the average temperature $T_{av}$ is decreased by the five percent and the calculation in block 102 is performed again. Once the average pressure is equal to or greater than the vapor pressure at the average temperature, there will be liquid present in the system.

In block 106 the boiling temperature is calculated using the average pressure $P_{av}$ and the vapor pressure $P_v(T)$. The boiling temperature $T_b$ is found using the formula $P_{av}=P_v(T_b)$.

In block 107, n, which is the number of moles of material to be vaporized at pressure P, and temperature $T_b$ to create a bubble of volume V, is found using the boiling temperature $T_b$, the volume of the bubble V, and the equation of state n (P, V, $T_b$).

In block 108 the minimum energy E required to form the bubble is calculated using the following general formula for calculating energy:

$$Ei = n\int_{T_{av}}^{T_b} C_p(t)dt + nH_v(T_b) + A\sigma(T_b)$$

In block 109 the energy E calculated above in block 108 is stored as the value $E_i$. An energy value $E_i$ is stored for each iteration of the index i. There will be stored in block 109 a value of $E_i$ that corresponds to the energy calculated for each iteration i. In block 111 it is determined whether the index i is less than or equal to imax. If the index i is less than or equal to imax then in block 112 the value of one (1) is added to i and the method returns to block 101 to repeat the calculation for another set of values. If it is determined in block 11 that the index i equals imax then the maximum number of iterations have been performed for this value set.

In block 114, the smallest value for energy E in the range of 1 to imax stored in block 109 is selected. This represents the minimum energy required to form the bubble for this value set.

If it was determined in block 111 that i equals imax, then in block 116 it is determined whether another value set is to be evaluated. If not, then the process ends. If another value set is to be evaluated the process returns to block 101.

These calculations are performed for the number of combinations of pressure, volume and temperature that are to be evaluated. The rninmum energy $E_i$ is compared for each combination of pressure, volume and temperature. The values of E, are compared in with the lowest value of E, indicating the optimum pressure with which to form the bubble. This pressure is the pressure for which E, is a minimum. While the invention is particularly useful for determining the optimum pressure at which to form a bubble in liquid, the method of the invention can be used to determine the effects of varying other parameters on bubble formation. For example, to determine the effects of using different liquids within which to form a bubble, parameters for the different liquids may be entered while leaving the pressure for each liquid constant.

Figure 3:
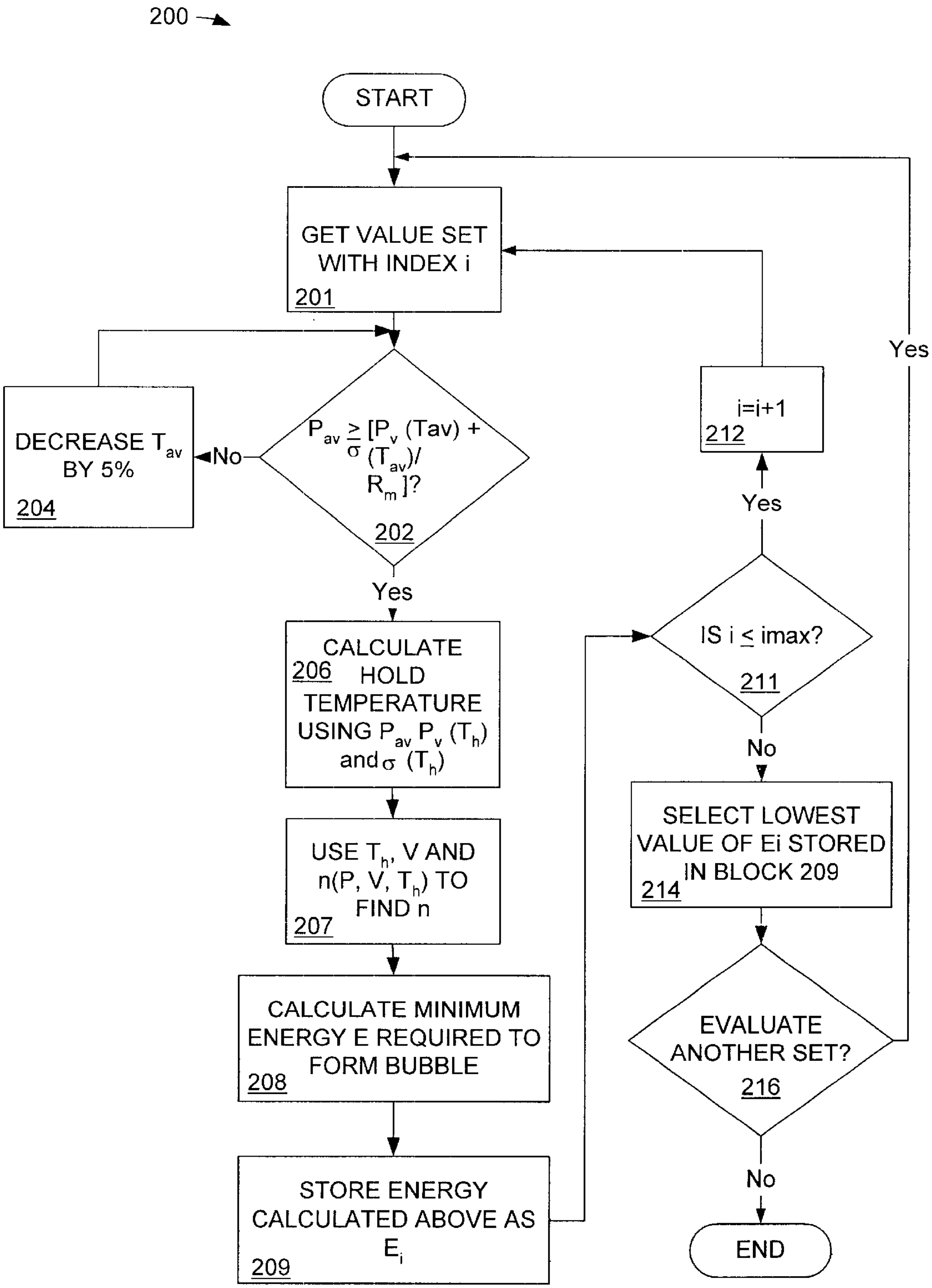
FIG. 3 is a flow chart illustrating an alternative embodiment of the method of the invention.

FIG. 3 is a flowchart illustrating an alternative embodiment of the method of FIG. 1.

FIG. 2 illustrates the method of the invention for use when the mean radius of curvature of the bubble can be estimated or is known.

In block 201 a set of values of each of the inputs set forth above with index i is input, with i equal to one. The set may contain different values for any of the inputs mentioned above.

In block 202 it is determined whether the average pressure $P_{av}$ is greater than or equal to (the vapor pressure $P_v$ at average temperature $T_{av}$)+$\sigma(T_{av})/R_m$, where $R_m$ is the mean radius of curvature of the bubble. If the average pressure $P_{av}$ is less than (the vapor pressure $P_v$ at average temperature $T_{av}$)+$\sigma(T_{av})/R_m$, then the liquid will not boil under these conditions so, in block 204, the average temperature $T_{av}$ is decreased by five percent and the calculation in block 202 performed again. If the calculation in block 202 results in the average pressure being equal to or greater than (the vapor pressure $P_v$ at average temperature $T_{av}$)+$\sigma(T_{av})/R_m$, then in block 206 the hold temperature $T_h$ is calculated using the average pressure $P_{av}$, $P_v(T)$ and $\sigma(T_{av})$. The hold temperature $T_h$ is found using the formula $[P_{av}+\sigma(T_h)/R_m]=P_v(T_h)$. The hold temperature is the temperature at which the vapor pressure maintains sufficient pressure on the liquid to equalize the effect of the average pressure on the system and the additional pressure caused by the surface tension at the bubble-liquid interface. The hold temperature is the temperature at which the system will hold a bubble in equilibrium. The hold temperature is slightly lower than the temperature at which bubbles begin to appear, and slightly higher than the boiling temperature at the pressure at which a bubble is maintained.

In block 207, n, which is the number of moles of material to be vaporized at pressure P, volume V and temperature $T_h$, is determined.

In block 208 the minimum energy E required to form a bubble is calculated using the following general formula for calculating energy:

$$E = n\int_{T_{av}}^{T_h} C_p(t)dt + nH_v(T_h) + A\sigma(T_h)$$

In block 209 the energy E calculated in block 208 is stored as the value $E_i$ similar to that described above. In block 211 it is determined whether the index i is less than or equal to imax. If the index i is less than or equal to imax then in block 212 the value one (1) is added to i and the process returns to block 201 for another set of values. If it is determined in block 211 that the index i equals imax, then the maximum number of iterations have been performed for this value set.

In block 214, the smallest value for energy $E_i$ in the range of i=1 to imax stored in block 209 is selected, which represents the minimum energy required to form the bubble for this value set.

If it was determined in block 211 that i equals imax, then in block 216 it is determined whether another value set is to be evaluated. If not, then the process ends. If another value set is to be evaluated the process returns to block 201.

These calculations are performed for as many combinations of pressure, volume and temperature that are to be evaluated. The minimum energy $E_i$ is compared for each combination. The lowest energy value represents the optimum pressure at which to form the bubble.

If the bubble will be pressed against a surface other than the liquid, e.g., the container wall, the surface tension term σ(T) in the energy calculation used in steps 108 (FIG. 2) and 208 (FIG. 3) can be modified to $A(liq)\sigma_{liq}(T_h)+A(w)\sigma_w(T_h)$, where (liq) is the area of the bubble exposed to the liquid, A(w) is the area of the bubble exposed to the wall, $\sigma_{liq}(T_h)$ is the surface tension of the liquid at temperature $T_h$, and $\sigma_w(T_h)$ is the interfacial energy of the liquid-wall interface at temperature $T_h$.

Furthermore, if an estimate of the heat capacity of the walls or other structures adjacent to the bubble is available, this estimate can be added to the heat capacity term $C_p$ (T) in the energy equation.

It should be understood that while in blocks 104 of FIG. 2 and 204 of FIG. 3 the average temperature is decreased by five percent, the average temperature may be modified by other values without departing from the scope of the invention.

The following two examples illustrate possible results obtained using the method of the invention.

EXAMPLE 1

In this example a bubble is to be used to form a mirror in an optical system, such as that described in U.S. Pat. No. 5,699,462 mentioned above. The required bubble volume is about $4\times10^{-8}$ $cm^3$, and the walls of the chamber force the bubble into a shape with a surface area of about $7.2\times10^{-5}$ $cm^2$. The liquid is 1-methylnaphthalene, whose normal boiling point is 245° C. The energy, in calories for each step of the bubble formation process, has been calculated for operation at pressures of $3.36\times10^{-3}$ atmospheres and 1.0 atmospheres and displayed in table 1 below:

TABLE 1

Bubble size and shape: Rectangular parallelepiped, 20 × 40 × 50 μm
Surface area, 7.20E−05 $cm^2$
Volume of bubble required, 4.00E−08 $cm^3$

| | Energy in Calories | | | | | |
|---|---|---|---|---|---|---|
| | 1 | 2 | 3 | 4 | 5 | 6 |
| Pressure (bar) | T, ° C. | moles | ∫ Cp dT | Hvap | Interface energy | TOTAL |
| $3.36\times10^{-3}$ | 80 | 4.64E−15 | 1.05E−11 | 6.06E−11 | 5.59E−11 | 1.27E−10 |
| 1 | 245 | 9.78E−13 | 1.23E−08 | 1.06E−08 | 2.95E−11 | 2.29E−08 |
| Ratios | | 211 | 1169 | 174 | 0.53 | 180 |

The third column, headed "$\int C_p$ dT" shows the energy required to heat the quantity of liquid indicated in column 2 from an assumed holding temperature of 40° C. to the boiling point. The fourth column, headed "Hvap" refers to the heat of vaporization in calories of the quantity of liquid referred to in column 2. Column 6 indicates that operation at 3.36 mbar, where the boiling temperature is 80° C. has a minimum energy requirement 180 times lower than operation at atmospheric pressure, where the boiling temperature is 245° C. This is due to the sharply lower number of moles of material required to be vaporized at 245° C. than at 80° C. as indicated in column 2, leading to the lower energies reflected in columns 2 and 3. The lower energies overwhelm the effect of the higher energy required to create the liquid-vapor interfaces, which are shown in column 4. Thus, a significant benefit is gained by forming this particular bubble at an ambient pressure of 3.36 mbar, at which pressure the boiling point $T_b$ is 80° C. instead of forming it at atmospheric pressure at which pressure the boiling point is 245° C.

EXAMPLE 2

A spherical bubble of radius 0.01 microns (μm) is required to push fluid in a tube. The liquid is ortho-Xylene and the pressures compared are 0.1 and 1.0 atmospheres. Table 2 below indicates that operating the device at the lower pressure slightly increases the minimum energy required to form a bubble at a lower than atmospheric pressure. It is understood that the liquid may also be another material such as water, an aqueous solution, toluene, alcohol, hydrocarbons and organic liquids.

TABLE 2

Bubble volume required: 4.19E−12 $cm^3$
r = 0.01 μm

| | Energy in Calories | | | | | |
|---|---|---|---|---|---|---|
| | 1 | 2 | 3 | 4 | 5 | 6 |
| Pressure (bar) | T, ° C. | moles | ∫ Cp dT | ΔHvap | Interface energy | TOTAL |
| 100 mbar | 74.5 | 1.48E−17 | 2.28E−04 | 1.44E−13 | 2.76E−11 | 2.78E−11 |
| 1 | 144.5 | 1.27E−16 | 5.97E−03 | 1.11E−12 | 1.84E−11 | 2.01E−11 |
| Ratios | | | 26.2 | 7.7 | 0.7 | 0.7 |

As indicated in Table 2, no energy reduction is obtained by reducing the pressure from 1 atmosphere to 0.1 atmospheres. In fact, for this set of factors, lowering the pressure to 0.1 atmospheres and the boiling point to about 75° C., increases the total energy required to form a bubble having a radius of 0.01 μm from 2.01E-11 calories to 2.78E-11 calories. In the case, illustrated in Table 2, it is undesirable to reduce the operating pressure because the possible energy reduction due to lowering the pressure to 0.1 atmospheres and the boiling point to about 75° C. does not overcome the effects of the increased heat of vaporization and the surface tension required to create a bubble at lower pressure.

It should be noted that in the calculations above, the number of moles required to form the bubble was estimated using the Berthellot equation of state to obtain the volume per mole at the given pressure. This equation is given in Perry's Handbook of Engineering. Using the more accurate Soave equation gave results which agreed with the estimate using the Berthellot equation of state to better than 1%. Because the results obtained from both equations are derived from different starting points, these results imply that both equations provide results that are very close to the actual values. The pressure was calculated for each liquid using the Wagner equation and tabulated constants. The heat capacity as a function of temperature was calculated with the method of Bondi as modified by Rowlinson, and the enthalpy of vaporization as a function of temperature was obtained with the Watson relationship. These equations and constants may be found in "The Properties of Gases and Liquids", $4^{th}$ edition (Reid, Robert C., John M. Prausnitz and Bruce E. Poling).

While forming a bubble at a lower ambient pressure may increase the energy consumption to provide the heat of vaporization and interface energy, the reduction in overall energy required to form the bubble is advantageous in many instances. The calculations presented in the tables do not include the effect of reducing the energy used for heating adjacent structures such as electrical leads, mechanical supports, and the like. Since these materials depend on the specific application, it is not possible to give a numerical estimate. However, it is clear that lower pressure operation, which leads to lower temperatures, will result in less energy being used for heating these adjacent materials. The calculations illustrate estimates of the minimum energy reduction, which can be achieved using the method of the invention.

It will be apparent to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

What is claimed is:

1. A method for determining optimum ambient pressure that minimizes the energy required to form a bubble of a given volume in a liquid, the method comprising the steps of:

entering a first pressure and a second pressure;

calculating a first boiling temperature corresponding to said first pressure;

calculating a second boiling temperature corresponding to said second pressure;

entering a surface tension of said bubble at said first boiling temperature and said second boiling temperature;

entering a heat of vaporization ($H_v$) value of said liquid at said first boiling temperature and said second boiling temperature;

calculating a first energy required to vaporize said liquid at said first pressure;

calculating a second energy required to vaporize said liquid at said second pressure;

determining whether said first energy required at said first pressure is greater than said second energy required at said second pressure; and forming said bubble at the pressure corresponding to the lower of said first energy or said second energy.

2. The method of claim 1, wherein said bubble is spherical.

3. The method of claim 1, wherein said bubble is non-spherical.

4. The method of claim 3, wherein said bubble is formed in an optical cross point switch element.

5. The method of claim 1, wherein said liquid is 1-methylnaphthalene.

6. The method of claim 1, wherein said liquid is chosen from the group consisting of water, an aqueous solution, toluene, alcohol, hydrocarbons and organic liquids.

* * * * *